Patented June 19, 1945

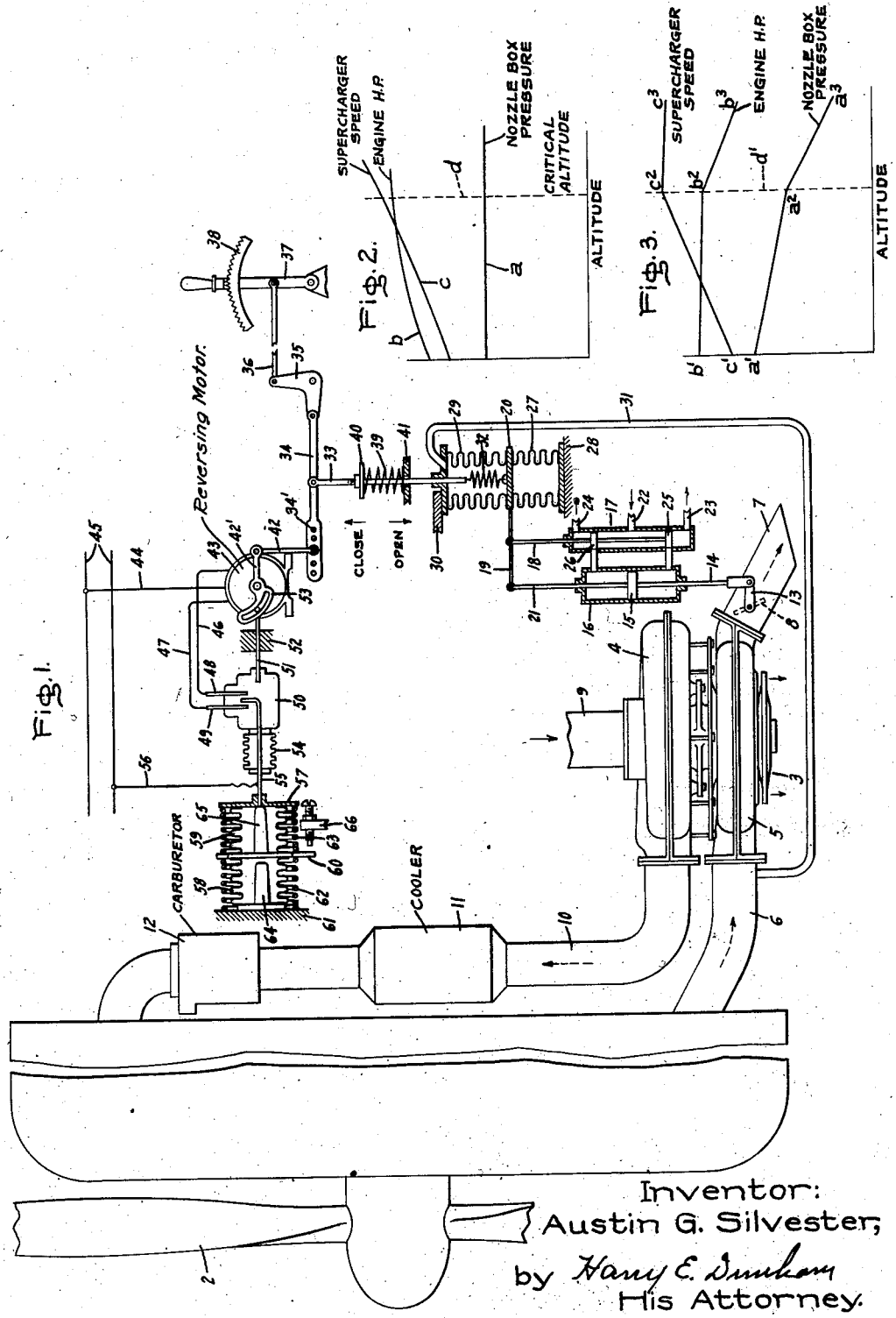

2,378,441

UNITED STATES PATENT OFFICE 2,378,441

AIRCRAFT SUPERCHARGER CONTROL

Austin G. Silvester, Swampscott, Mass., assignor to General Electric Company, a corporation of New York Application February 21, 1942, Serial No. 431,861

12 Claims. (Cl. 60—13)

The present invention relates to aircraft supercharger control for superchargers of the type comprising a gas turbine driven by exhaust gases from an aircraft engine. In such installations, the exhaust manifold of the aircraft engine is connected by a conduit to the nozzle box of the gas turbine and the primary control is effected by means of a waste gate valve connected in parallel with the nozzle box and controlling flow of exhaust gases from the exhaust manifold directly to atmosphere. When the waste gate valve is wide open, the exhaust gases discharge directly to atmosphere. The nozzle box pressure is then equal substantially to atmospheric pressure so that but little gas flows from the nozzle box through the turbine nozzles to the turbine wheel. The turbine wheel may then be turning at what may be termed idling speed. As the waste gate valve is moved toward closed position, the exhaust gas pressure in the nozzle box is gradually built up so that more and more gases are directed through the turbine wheel, the maximum condition being reached when the waste gate valve is fully closed. The power delivered to the turbine wheel is a function of the drop in pressure across the wheel, i. e., the difference between nozzle box pressure and atmospheric pressure.

It is now the usual practice to control the waste gate valve by nozzle box pressure, the control being set for a certain nozzle box pressure, and automatically maintaining such pressure with changes in altitude. Due to changes in atmospheric pressure with changes in altitude, this serves to effect changes in the supercharger speed, the speed increasing with increase in altitude and decreasing with decrease in altitude. However, this does not give constant power output of the aircraft engine, the thing desired, but actually results in an increase in power output with increase in altitude. As a result, with a control of this type, if the operator is to maintain constant power output, he must adjust his control for lower and lower nozzle box pressures with increase in altitude. In addition, if the operator increases his altitude above rated altitude of the supercharger, he must decrease the nozzle box pressure and the engine power output to prevent overspeeding of the supercharger.

The object of the present invention is to provide an improved supercharger control wherein the control is effected primarily by nozzle box pressure but such control is modified automatically to maintain substantially constant engine power output up to rated supercharger altitude after which it maintains rated supercharger output, the engine power output decreasing.

For a consideration of what I believe to be novel and my invention, attention is directed to the following specification and the claims appended thereto.

In the drawing, Fig. 1 is a diagrammatic view of a supercharger control system embodying my invention and Figs. 2 and 3 are diagrams.

Referring to the drawing, 1 indicates a portion of an aircraft in which is enclosed an aircraft engine which drives a propeller 2. Associated with the engine is a supercharger comprising a gas turbine 3 and a centrifugal compressor 4. Exhaust gases from the aircraft engine are supplied to nozzle box 5 of the gas turbine through a conduit 6. Connected to the nozzle box is a waste conduit 7 in which is located a waste gate valve 8 which forms the control means for the gas turbine. Air is supplied to the compressor 4 through a conduit 9 and is discharged from the compressor through a conduit 10 which conveys the air through an intercooler 11 and a carburetor 12 to the aircraft engine intake.

The operation of an exhaust gas driven supercharger is known and requires no detailed explanation.

Exhaust gases from the aircraft engine are supplied to the nozzle box and discharged from the nozzles in the nozzle box against the turbine wheel to effect its rotation and driving of the centrifugal compressor. Waste conduit 7 discharges directly to atmosphere. When waste gate valve 8 is open, conduit 7 permits the exhaust gases supplied to the nozzle box to exhaust directly to atmosphere, little, if any, passing through the nozzles to the turbine wheel. This represents idle operation of the supercharger. As waste gate valve 8 is moved toward closed position, more and more of the exhaust gases are caused to flow through the nozzles to the turbine wheel, closing of the waste gate valve building up exhaust gas pressure in the nozzle box. When waste gate valve 8 is completely closed, all the gases are then discharged to the bucket wheel which represents maximum load on the supercharger.

On one end of the valve spindle of waste gate valve 8 is fixed an arm 13 pivotally connected to one end of the piston rod 14 of a fluid actuated servo-motor which has a piston 15 and a cylinder 16 controlled by a pilot valve 17. The stem 18 of the pilot valve is pivotally connected to an intermediate point of a floating lever 19, one end of which is pivotally connected to a movable abutment 20 and the other to a piston rod 21 connected to piston 15. This forms a usual type of follow-up connection for the servo-motor. The inlet pipe through which fluid pressure is supplied to the pilot valve is indicated at 22 and the outlet pipes at 23 and 24. The pilot valve heads are indicated at 25 and 26.

Movable abutment 20 is subjected to and arranged to be positioned by the absolute pressure obtaining in the nozzle box. Any suitable means may be used for this purpose. In the present instance, abutment 20 has on one side an evacuated bellows 27 mounted on a fixed support 28 and on the other side a bellows 29 mounted on a fixed support 30, the interior of bellows 29 being connected to the nozzle box by a pipe 31. Thus, the upper surface of abutment 20 is subjected to absolute nozzle box pressure.

Connected at one end to abutment 20 is a tension spring 32, the other end of which is connected to an end of a rod 33 which projects with a sliding fit through an opening in the top wall of bellows 29. The upper end of rod 33 is pivotally connected to an intermediate point on a floating lever 34. One end of floating lever 34 is pivotally connected to one arm of a bell crank lever 35, the other arm of which is connected by a link 36 to a hand lever 37 adjusted over a quadrant 38. Surrounding rod 33 is a compression spring 39 which at its upper end engages an adjustable abutment 40 on rod 33 and at its other end a fixed support 41 having an opening through which rod 33 freely passes. Spring 39 acts in opposition to spring 32 and serves to compensate for a major portion of the pull of spring 32 on rod 33. Spring 32 is normally under considerable tension and spring 39 prevents the entire tension of spring 32 from being applied to the lever mechanism. The lower end of rod 33 forms a normally fixed support for the upper end of spring 32, rod 33 being normally held in a fixed position to which it has been adjusted.

Assuming that the left hand end of lever 34 is fixed, it will be seen that by adjusting hand lever 37 along quadrant 38, rod 33 can be raised or lowered to increase or decrease the tension of spring 32, thus changing the setting of the regulator comprising abutment 20. Each setting of spring 32 corresponds to a certain nozzle box pressure so that by adjusting the tension of spring 32, the nozzle box pressure for which the governor is set can be varied. Having been set for a certain nozzle box pressure, such pressure will be maintained automatically by the regulator. If the pressure tends to increase, the increased pressure acting on the upper surface of abutment 20 will lower the abutment against the action of spring 32 (rod 33 being stationary) and acting through the fluid operated servo-motor will open somewhat waste gate valve 8. Opening of waste gate valve 8 permits more of the exhaust gases to escape directly to atmosphere which results in a decrease in nozzle box pressure. In a similar manner, waste gate valve 8 is closed somewhat if the nozzle box pressure tends to decrease.

Assuming now a condition of changing altitude, as the aircraft ascends, the supercharger must be operated at higher and higher speeds in order to maintain engine horse power. This result is effected by the gradual closing of waste gate valve 8 to maintain substantially constant nozzle box pressure. However, as already pointed out, substantially constant nozzle box pressure does not result in substantially constant engine horse power. Referring to Fig. 2, for example, wherein the abscissa represent altitude and the ordinates nozzle box pressure, supercharger speed, and engine horse power, it will be seen that constant nozzle box pressure represented by line $a$ results in increase in horse power with increase in altitude as represented by line $b$; also, it results in continuously increasing supercharger speed as represented by line $c$. In Fig. 2, vertical line $d$ represents rated supercharger speed, or what may be termed the critical altitude of the supercharger, i. e., the altitude up to which the supercharger is designed to maintain full engine horse power. Beyond this altitude, the supercharger must be operated at above its rated speed if constant nozzle box pressure is maintained.

According to my invention, I provide in connection with the control for the supercharger, automatic means for modifying its setting so as to maintain a desired load characteristic on the aircraft engine with change in altitude, for example, constant engine horse power, up to rated altitude for the supercharger, i. e., up to rated supercharger speed, and thereafter maintain rated supercharger speed.

A desirable condition of operation is represented in Fig. 3, for example, wherein constant engine horse power is maintained up to critical supercharger altitude as represented by line $b^1$, $b^2$ after which constant supercharger speed is maintained as represented by line $c^2$, $c^3$. To obtain this result, the nozzle box pressure decreases gradually up to critical supercharger altitude along the line $a^1$, $a^2$ while the supercharger speed gradually increases along the line $c^1$, $c^2$. Above critical supercharger altitude, the supercharger speed remains constant while the nozzle box pressure decreases along line $a^2$, $a^3$ and the engine horse power decreases along the line $b^2$, $b^3$.

Referring now to Fig. 1, the left hand end of floating lever 34 is pivotally connected by a link 42 to an arm 42' fixed on the end of the shaft of a reversing motor 43. The end of lever arm 34 is provided with a number of openings 34' into any one of which link 42 may be connected to adjust the effective length of the lever arm. The common lead of motor 43 is connected by a conductor 44 to one side of a source of electrical energy 45 and the other two leads are connected by conductors 46 and 47 to two spaced contacts 48 and 49 carried in a circuit closer housing 50. Housing 50 is supported on one end of a rod 51 slidable in a fixed support 52 and having its other end in engagement with a cam 53 on the motor shaft. In the present instance, a closed cam is shown, rod 51 having an offset end which fits in the cam slot. With this arrangement, when the motor shaft turns, cam 53 turns with it to cause reciprocating movement of circuit closer housing 50. Circuit closer housing 50 may be in the form of an evacuated glass envelope. Projecting into housing 50 and sealed to the housing by a flexible bellows 54 is a contact rod 55 having an end which lies between contacts 48 and 49. Contact rod 55 is connected by a conductor 56 to the other side of the source of current 45.

The outer end of rod 55 is connected to the head 57 of a pressure responsive device comprising a primary evacuated bellows 58 and a secondary evacuated bellows 59 separated from each other by a wall 60 and mounted on a fixed support 61. Located between support 61 and wall 60 is a compression spring 62 which acts in a direction to distend bellows 58 and located between wall 60 and head 57 is a compression spring 63 which acts in a direction to distend bellows 59. Collapsing movement of the bellows is limited by stops 64 and 65 respectively and distending movement of bellows 58 is limited by an adjustable stop 66. The pressure responsive device is subjected to altitude atmospheric pressure and the arrangement, including the relative strengths of the two springs 62 and 63, is such that beginning at a desired altitude, primary bellows 58 is gradually distended with increase in altitude until supercharger critical altitude is reached at which time wall 60 engages stop 66, after which secondary bellows 59 is gradually distended with increase in altitude. Distension of either bellows moves contact rod 55 toward the right and into engagement with contact 48 closing a circuit on motor 43 to effect turning of the motor shaft in a clockwise direction as viewed in Fig. 1. This lowers the left hand end of floating lever 34, thus moving downward rod 33 to set the regulator for a lower nozzle box pressure, the regulator acting to open somewhat waste gate valve 8 to achieve this result. When the motor shaft turns in clockwise direction, cam 53 effects movement of circuit closer housing 50 toward the right to open the motor circuit. The arrangement is such that with increasing altitude up to supercharger critical altitude, primary bellows 58 modifies the setting of the regulator comprising bellows 27, 29 so that it holds a nozzle box pressure which will give the desired engine load characteristic, for example, constant engine horse power, with increasing altitude up to supercharger critical altitude, after which secondary bellows 59 will come into action to modify the setting of the regulator to hold nozzle box pressures which with increasing altitudes will maintain constant supercharger speed.

With decreasing altitude, bellows 58 and 59 act in a similar manner except in the opposite direction, contact rod 55 engaging contact 49 to effect operation of motor 43 in a direction to increase the nozzle box pressure for which the regulator is set.

By connecting link 42 in different openings 34', the effect of a given movement of the motor on the spring 32 may be varied.

While I have particularly illustrated and described my invention as applied to a control system for a supercharger wherein the regulator is responsive to nozzle box pressure, it will be understood that my invention is not limited thereto but may be used in control systems wherein the control is responsive to operating conditions of the supercharger other than nozzle box pressure.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, an aircraft internal combustion engine, a supercharger comprising a compressor and a gas driven turbine wheel, a conduit for conveying exhaust gases from the engine to the turbine, a conduit for conveying air from the compressor to the engine, valve means for regulating the gas supply to the turbine, a regulator responsive to the absolute pressure of the gas supplied to the turbine for positioning said valve means, and means responsive to altitude pressure for modifying the setting of said regulator to maintain a desired load characteristic on the engine with variations in altitude, said last named means including an atmospheric pressure responsive device effective at all altitudes to prevent the engine power output from rising beyond a certain ground level power output.

2. In combination, an aircraft internal combustion engine, a supercharger comprising a compressor and a gas driven turbine wheel, a conduit for conveying exhaust gases from the engine to the turbine, a conduit for conveying air from the compressor to the engine, valve means for regulating the gas supply to the turbine, a regulator responsive to the pressure of the gas supplied to the turbine for positioning said valve means in response to any change of absolute gas pressure, manual means for adjusting the setting of said regulator, and means responsive to altitude pressure for modifying the setting of said regulator and for limiting the speed of the turbine to maintain a desired load characteristic on the engine with variations in altitude.

3. The combination with an aircraft engine and a supercharger for the engine, of automatic means including a pressure responsive device for regulating the supercharger to maintain constant power output of the engine up to rated altitude of the supercharger and another device connected to the first mentioned device to regulate the supercharger to maintain constant speed of the supercharger above said rated altitude.

4. The combination with an aircraft engine and an exhaust gas driven supercharger for supplying air thereto, of regulating means operative at all altitudes and responsive to the pressure of the exhaust gases for regulating the supercharger, and other means responsive to altitude atmospheric pressure for modifying the setting of said regulating means to maintain constant power output on the engine between ground level and a rated altitude of the supercharger and thereafter to maintain constant supercharger load.

5. The combination with an aircraft internal combustion engine and a gas turbine driven supercharger for supplying air to the engine, of a regulator for the supercharger, means responsive to absolute pressure changes in the supercharger for positioning said regulator, and other means responsive to altitude atmospheric pressure for modifying the setting of the first mentioned means to give a desired engine power output between ground level and supercharger critical altitude and thereafter to give constant supercharger speed.

6. The combination with an aircraft internal combustion engine and a gas turbine driven supercharger for supplying air to the engine of a control mechanism for the supercharger comprising a device responsive to any change of absolute pressure in the supercharger, a floating lever, means including an adjustable spring connecting the device to the lever, manually operated means connected to the lever for varying the setting of said spring to vary the load output of the engine at a given altitude, and other means connected to the lever to modify the action of said absolute pressure responsive device in response to any change in atmospheric pressure to maintain the load output of the engine substantially constant between ground level and a certain altitude and to effect a decrease of the load output above said altitude.

7. The combination with an aircraft internal combustion engine and a gas turbine driven supercharger for supplying air to the engine of a control mechanism for the supercharger comprising a device responsive to absolute pressure changes in the supercharger, a floating lever, means including an adjustable spring connecting the device to the lever, manually operated means connected to the lever for varying the setting of said spring to vary the load output of the engine at a given altitude, and other means connected to the lever to modify the action of said absolute pressure responsive device in response to change of altitude to maintain the load output of the engine substantially constant between ground level and a certain altitude and to effect a decrease of the load output above said altitude, said other means including two atmospheric pressure responsive devices having different characteristics and one device being operative below and the other device above said certain altitude.

8. The combination with an aircraft engine and a supercharger for the engine, of automatic means for regulating the supercharger to maintain substantially constant power output of the engine up to the rated altitude of the supercharger and thereafter regulating the supercharger to maintain substantially constant speed of the supercharger, said means comprising a primary control mechanism for the supercharger and an auxiliary control mechanism for modifying the operation of the primary control mechanism including an atmospheric pressure responsive device effective at low altitude and another atmospheric pressure responsive device effective only at high altitude.

9. In combination, an aircraft internal combustion engine, a compressor for supplying air under pressure to the engine, a gas turbine for driving the compressor having an inlet nozzle box with a waste gate to atmosphere and being connected to receive exhaust gases from the engine, and a regulating mechanism for the waste gate comprising means responsive to any changes of absolute nozzle box pressure and other adjustable means for manually and automatically modifying the operation of said first mentioned means to decrease the nozzle box pressure with increasing altitude at a rate sufficient to preclude the engine output from rising above a certain sea level output and to preclude the turbine speed from rising above a predetermined value.

10. In combination, an aircraft internal combustion engine, a gas turbine driven supercharger for supercharging the engine including a gas turbine having a nozzle box connected to receive exhaust gases from the engine and a waste gate for discharging gases from the nozzle box, and a control mechanism for the waste gate comprising a device responsive to changes of absolute nozzle box pressure, and means responsive to changes of atmospheric pressure for modifying the operation of said device to effect decreasing nozzle box pressure with increasing altitude at a rate to maintain the engine output up to a certain altitude substantially constant and equal to a predetermined sea level output, means to vary the sea level output, and other means gradually to reduce said output above said certain altitude.

11. In combination, an aircraft internal combustion engine, a gas turbine driven supercharger for the engine including a gas turbine nozzle box having a waste gate and being connected to receive exhaust gases from the engine and a control mechanism for the waste gate comprising a device responsive to changes of absolute nozzle box pressure, and means for modifying the operation of said device including a first atmospheric pressure responsive device and a second atmospheric pressure responsive device dimensioned to effect substantially constant engine output between sea level and a predetermined altitude and substantially constant supercharger speed above said predetermined altitude.

12. In combination, a gas turbine driven supercharger for aircraft including a gas turbine with a nozzle box having a waste gate and a control mechanism for the waste gate comprising a device responsive to any change of absolute nozzle box pressure, and means for modifying the operation of said device including a first atmospheric pressure responsive device operative below a predetermined altitude and a second atmospheric pressure responsive device operative above said predetermined altitude to effect decreasing nozzle box pressure with increasing altitude between sea level and said predetermined altitude and substantially constant supercharger speed above said predetermined altitude, and means for varying the setting of the first mentioned device.

AUSTIN G. SILVESTER.